Patented Jan. 5, 1943

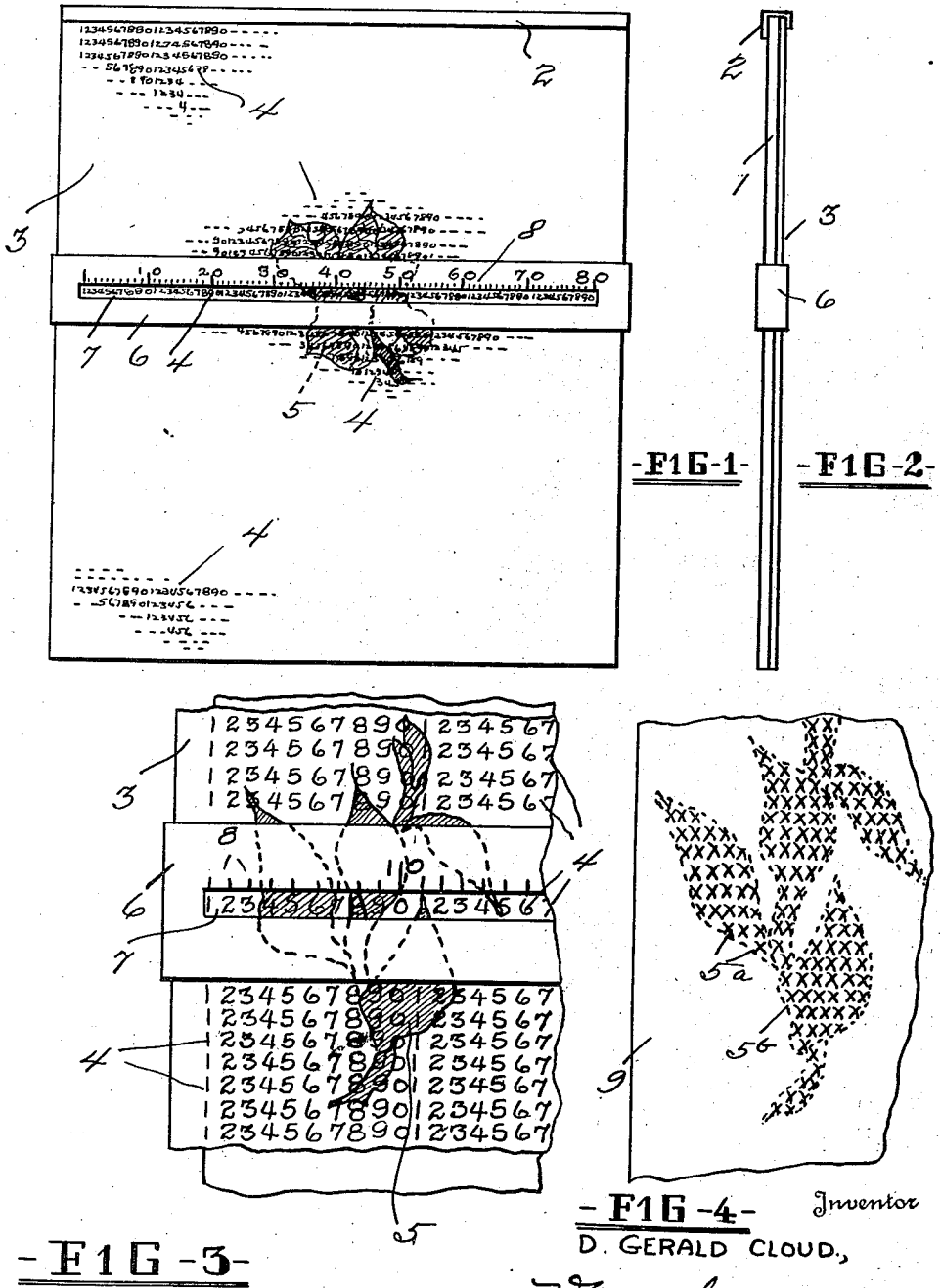

2,307,358

UNITED STATES PATENT OFFICE 2,307,358

MEANS FOR COPYING PICTURES

Dan Gerald Cloud, Seattle, Wash.

Application November 18, 1940, Serial No. 366,193

2 Claims. (Cl. 33—1)

My present invention, in its broad aspect, has to do with improvements in means and methods whereby pictures, designs, symbols, pictorial representations and the like, may be formed or copied upon a typewriter or the like. Furthermore, my invention has to do with means and methods whereby graduations in shading and the like may be attained as well as accurate representation of the outline, contour, and form of the picture, design or pictorial representation. More particularly it is my purpose to provide a transparent guide sheet having indicia thereon delineating or distinguishing the parts and portions of the picture or the like to be copied and which is designed to be placed upon or over the picture or design to be copied so that the picture as well as the indicia on the transparent sheet are visible and the portions or parts of the picture properly designated by and associated with the indicia. In addition, and to be used in associated and in cooperation with the transparent guide sheet and the indicia thereon, I provide a slidable, slotted gauge corresponding to the gauge on a typewriter or the like and which is used to designate and segregate those indicia on the transparent guide sheet and its associated picture so that the picture, symbol, design or pictorial representation may be accurately copied by reference to and proper following of the guide sheet and gauge.

Other and equally important objects and advantages of my invention may be briefly defined as follows: (1) my invention is simple, practical, relatively inexpensive to manufacture and use, and is adapted to use on any, or in connection with any, conventional form of typewriter or the like; (2) graduations in shading may be accurately portrayed or copied, and accuracy in outline and contour attained; (3) my invention has but two parts, namely the guide sheet and the gauge, which parts cooperate with each other to attain the desired results, and these parts are associated with a suitable backing or base, between which and the guide sheet the picture or the like is placed; such base forming a suitable and substantial part on which the gauge may be slid up and down; (4) my invention may be used in secretarial schools and the like to induce familiarity with typewriter keyboards, or for pictorial or advertising purposes and the like, and (5) my invention may be made and sold at relatively small cost and parts replaced when worn.

Other and equally important objects and advantages will be apparent hereinafter, but emphasis is laid upon the fact that changes may be made in size, shape, form, construction and arrangement of parts provided such changes fall within the scope of my invention as defined in the claims appended hereunto.

In the drawing wherein I have illustrated the preferred form of my invention:

Figure 1 is a front elevation thereof;

Figure 2 is an edge view;

Figure 3 is an enlarged fragmentary view, and

Figure 4 is a fragmentary view of a picture made in accordance with the teachings of my method and by my means.

In the drawing wherein like characters of reference are used to designate like or similar parts throughout the several views:

The numeral 1 designates a stiff cardboard or other paper back, on which is fastened by a suitable binding 2 a transparent sheet 3. The transparent sheet 3 has displayed thereon and over the entire surface thereof as shown in Figure 3, and as indicated on Figure 1, equally spaced apart numbers in sequence (from 1 to 10, i. e. 1, 2, 3, 4, 5, 6, 7, 8, 9, 0, 1, 2, 3, 4, 5, 6, 7, 8, 9, 0 et cetera) in vertical and horizontal alignment These numbers or indicia 4 are preferably printed on the transparent sheet 3 with some type of inconspicuous but discernable ink or the like, so that when a picture 5 is placed beneath the transparent sheet it will be clearly visible, but the numbers will show over its surface as shown in Figure 3. Slidably mounted on the base or back 1 and its attached transparent sheet 3 is a gauge 6 which has a horizontal slot 7 suitably graduated as at 8. These graduations correspond with the graduations on the scale of an ordinary typewriter—not shown. The gauge is movable up and down the transparent sheet to delineate rows of the numbers or indicia thereon so that when a picture to be copied is placed beneath the transparent guide sheet the parts or portions of the picture will be designated and indicated by the numbers appearing in the slot of the movable gauge, and accordingly by locating those numbers on the typewriter scale, and striking a key on the keyboard an imprint 5a is made on the sheet 9 in the typewriter corresponding in location to the number appearing in the gauge for that portion of the picture. Thus when all numbers corresponding to all portions or parts of the picture are transcribed to the sheet in the typewriter a substantially exact copy 5b will be made. Of course, the gauge is moved down the sheet line for line so that in effect the entire picture is scanned. Care should be taken that nothing should be copied except that which is exactly under the number on the transparent sheet corresponding with the number on the typewriter keyboard. Thus in operation, the picture to be copied is inserted under the transparent sheet and suitably fastened so that it will not become displaced; the picture is then placed in a good light so that the numbers on the transparent sheet appearing in the slot of the movable gauge will be clearly visible. The blank sheet on which the picture is to be transcribed is inserted in the typewriter, and the gauge set at the top of the picture. The typewriter carriage is set so that the typewriter gauge or scale corresponds with the movable gauge, and the numbers are then typed upon the sheet, the letter "x" forms a very good picture, but variations in shading and the like may be made by using different typewriter numbers and letters; for instance the letter "x" when overprinted with "o" will produce an almost black effect. Photographs and halftones are usually more difficult to transcribe than large black and white pictures such as cartoons, and a fine choice of light and dark effects can be produced by utilizing various keys on the typewriter keyboard and varying the intensity of the stroke, so also refinements in shape may be indulged in by varying the assortment of keys on the typewriter used. The picture so produced appears most clearly when held slightly away from the eyes, say a few feet away. Many and varied effects may be produced, but for illustration a very simple representation has been used in the drawings appended thereto.

It is to be understood that the scope of my invention is not to be limited by the specific form described herein, but should only be interpreted on the light of the claims appended hereunto.

I claim:

1. Means for designating parts or portions of a pictorial representation for purposes of transcription, comprising a tablet like member having a supporting base on which the pictorial representation is laid, a transparent sheet in conjunction with the base designed to be placed over said pictorial representation and having indicia imprinted over the surface thereof through which the pictorial representation is visible identifying portions of the same to be transcribed and copied, and said indicia conforming to a predetermined arrangement, and a slidable gauge movable over the surface of the transparent sheet to delineate certain of the indicia thereon and those portions of the pictorial representation visible beneath said delineated indicia, and said gauge having a scale conforming to the scale of the medium of transcription.

2. A device of the character described comprising a base, a transparent sheet, means for attaching the transparent sheet along one of its edges to an edge of the base, vertically and horizontally aligned numbers printed in light substance through which a pictorial representation may be seen arranged in sequential relationship substantially covering the surface of said transparent sheet, a movable gauge carried by the base and extending across the transparent sheet and having a horizontal slot arranged to delineate rows of the numbers, said gauge having a scale thereon conforming to the scale of a conventional typewriter or other medium used to transcribe a picture retained beneath the transparent sheet and visible therethrough and the numbers on the transparent sheet being distinguishable over the picture.

D. GERALD CLOUD.